(12) United States Patent
Cawthorne et al.

(10) Patent No.: US 7,587,442 B2
(45) Date of Patent: Sep. 8, 2009

(54) METHOD OF DETERMINING THE DERIVATIVE OF AN INPUT SIGNAL

(75) Inventors: William R. Cawthorne, Milford, MI (US); Jy-Jen F. Sah, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 631 days.

(21) Appl. No.: 10/846,018

(22) Filed: May 14, 2004

(65) Prior Publication Data

US 2005/0256919 A1    Nov. 17, 2005

(51) Int. Cl.
G06F 7/00       (2006.01)

(52) U.S. Cl. ...................................... 708/443; 327/335

(58) Field of Classification Search ......... 708/443–446; 327/335
See application file for complete search history.

(56) References Cited

U.S. PATENT DOCUMENTS

| | | | |
|---|---|---|---|
| 3,892,952 A | * | 7/1975 | Shibata et al. ............... 702/141 |
| 5,214,676 A | * | 5/1993 | Wilkinson ................... 375/371 |
| 6,115,726 A | * | 9/2000 | Ignjatovic ................... 708/300 |

FOREIGN PATENT DOCUMENTS

| | | |
|---|---|---|
| DE | 2806846 | 8/1979 |
| DE | 4216811 | 11/1993 |
| DE | 4222346 | 2/1994 |
| DE | 69524877 | 1/2002 |

* cited by examiner

*Primary Examiner*—Lewis A Bullock, Jr.
*Assistant Examiner*—Michael Yaary

(57) ABSTRACT

The derivative of a noise-containing input signal is determined by using an aliased derivative to periodically reset a filtered version of a normally determined derivative. The aliased derivative is calculated using a slower update or sampling rate than the normally determined derivative, and the filtered version of the normally determined derivative is reset to a reset value at each update of the aliased derivative. The reset value is based on a weighted sum of the aliased derivative and the filter output. The periodically reset filter output closely follows an idealized derivative of the input signal, substantially eliminating the phase delay introduced by conventional filtering.

4 Claims, 2 Drawing Sheets

METHOD OF DETERMINING THE DERIVATIVE OF AN INPUT SIGNAL

TECHNICAL FIELD

The present invention relates to determining the derivative (i.e., the rate of change with respect to time) of a noise-containing input signal without introducing phase delay due to filtering.

BACKGROUND OF THE INVENTION

It is commonly necessary in control applications to determine the derivative of a measured input signal. In the control of a motor vehicle transmission, for example, a controller produces a digital speed signal based on the output of a shaft speed sensor, and then determines the acceleration of the shaft by computing the derivative of the speed signal. In such an application, conventional derivative calculations are problematic due to the presence of spurious noise in the measured signal, as the derivative of the noise is typically much larger than the derivative of the signal. The usual approach is to low-pass filter either the input signal or its derivative to remove or severely attenuate the noise-related component. However, the filtering introduces phase-delay, which is particularly undesirable if the derivative is to be used for control purposes. Accordingly, what is needed is a way of effectively determining the derivative of a noise-containing input signal without introducing any significant phase delay.

SUMMARY OF THE INVENTION

The present invention is directed to an improved method of determining the derivative of a noise-containing input signal where an aliased derivative is used to periodically reset a filtered version of a normally determined derivative. The aliased derivative is calculated using a slower update or sampling rate than the normally determined derivative, and the filtered version of the normally determined derivative is reset to an alias-based reset value at each update of the aliased derivative. Preferably, the reset value is determined according to a weighted sum of the aliased derivative and the filter output. The periodically reset filter output closely follows an idealized derivative of the input signal, substantially eliminating the phase delay introduced by conventional filtering.

DESCRIPTION OF THE PREFERRED EMBODIMENT

While the method of the present invention may be applied to any type of digital or analog input signal, it is disclosed herein in the context of an application involving a speed transducer and a rotary shaft such as a transmission input or output shaft. In a typical implementation, the speed transducer is positioned in proximity to the periphery of a toothed wheel fixed to the shaft and generates an electrical pulse with the passage of each tooth of the wheel. The pulses are fed to a circuit that produces a digital signal with logic level transitions corresponding to leading and/or trailing edges of the pulses, and the value of a free-running counter is sampled at specified transitions (i.e., zero-to-one, or one-to-zero) of the digital signal. Successive counter samples are differenced to form a succession of time intervals that are inversely proportional to the rotary speed of the shaft. In a dynamic system, the succession of time intervals defines a digital input signal that may be numerically differentiated to determine the acceleration of the shaft. In an analog implementation, the magnitude of the input signal is periodically sampled and converted to a corresponding digital value by an analog-to-digital converter to form a succession of digital values.

Figure 1:
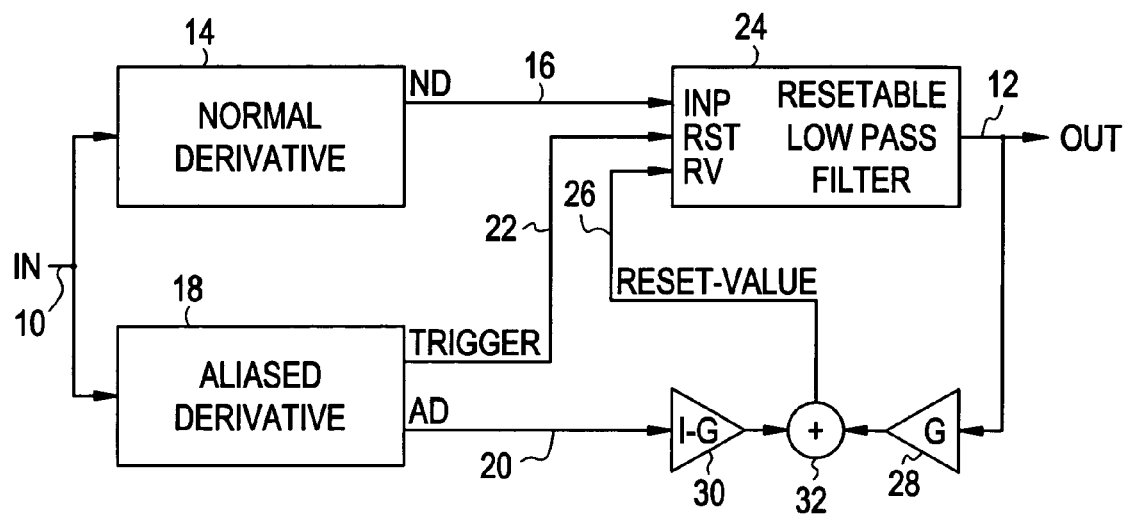
FIG. 1 is a block diagram of a method for determining the derivative of a digital input signal according to this invention.

Referring to FIG. 1, the method of this invention is illustrated as a block diagram where a noise-containing input signal (IN) is applied to line 10, and an output signal (OUT) representing the derivative of IN is produced on line 12. The functionality of the various blocks may be implemented in various ways, the most common of which is with a microprocessor programmed to carry out the underlying mathematical operations.

The input IN comprises a succession of digital values representative of input signal magnitudes sampled at a rate sufficiently great with respect to the input signal frequency to prevent aliasing. For example, if the input signal has a maximum frequency f, the sampling rate is at least (2*f). The block 14 produces a normal derivative (ND) of IN on line 16, and the block 18 produces an aliased derivative (AD) of IN on line 20. The normal derivative ND is based on a conventional derivative calculation, exemplified by:

$$ND(k)=[IN(k)-IN(k-1)]/\Delta t \quad (1)$$

where k is the sample number, IN(k) and IN(k−1) are the current and previous samples of input IN, and $\Delta t$ is the time interval between successive samples. The aliased derivative AD is computed in much the same way, except that the time interval between successive samples is an integer multiple (R) of $\Delta t$. Using the same notation as in equation (1), the aliased derivative AD is given by:

$$AD(R*k)=[IN(R*k)-IN(R(k-1))]/(R*\Delta t) \quad (2)$$

For example, if R=5, the aliased derivative AD will be calculated based on every fifth sample of the input IN, and will updated one-fifth as fast as the normal derivative ND. At each such update of the aliased derivative AD, the block 18 produces a trigger signal (TRIGGER) on line 22.

The block 24 designates a conventional first-order or second-order low-pass filter that can be reset to a supplied reset value on command. The normal derivative ND is applied to the input (INP) of block 24, and a filtered version of ND is produced as the output OUT on line 12. The TRIGGER signal produced by block 18 on line 22 is applied to the reset terminal (RST) of filter block 24, and a reset value (RESET_VALUE) on line 26 is applied to the reset value (RV) terminal of filter block 24. The RESET_VALUE signal on line 26 is a weighted sum of the filter output OUT on line 12 and the aliased derivative AD on line 20. The block 28 applies a calibrated fractional gain G (which may have a value of 0.5, for example) to OUT, and the block 30 applies the complement of gain G (that is, 1-G) to AD, and the results are summed by block 32 to form the RESET_VALUE signal on line 26. Thus, the output signal OUT is a filtered version of ND that is periodically reset to a RESET_VALUE based on a weighted sum of OUT and AD.

As indicated by the block diagram of FIG. 1, the method of the present invention combines the information gleaned from both the normal derivative ND and the aliased derivative AD. The normal derivative ND contains the correct phase information, while the aliased derivative AD is statistically insensitive to random noise superimposed on the input IN. Combining the aliased derivative AD and the filtered normal derivative to form the filter reset value (RESET_VALUE) produces a filter output (OUT) that retains the phase attribute of the normal derivative ND and the noise insensitivity of the aliased derivative AD.

Figure 2:
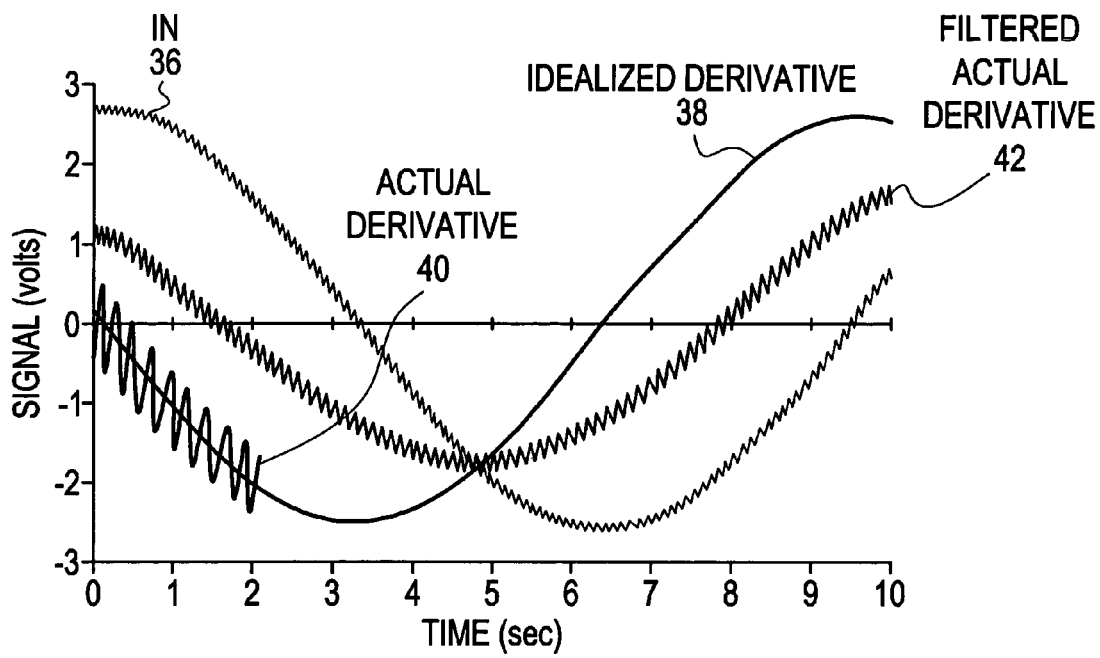
FIG. 2 graphically depicts a noise-containing sinusoidal waveform, an idealized derivative of the waveform, an actual derivative of the waveform and a filtered version of the actual derivative, all as a function of time.
Figure 3:
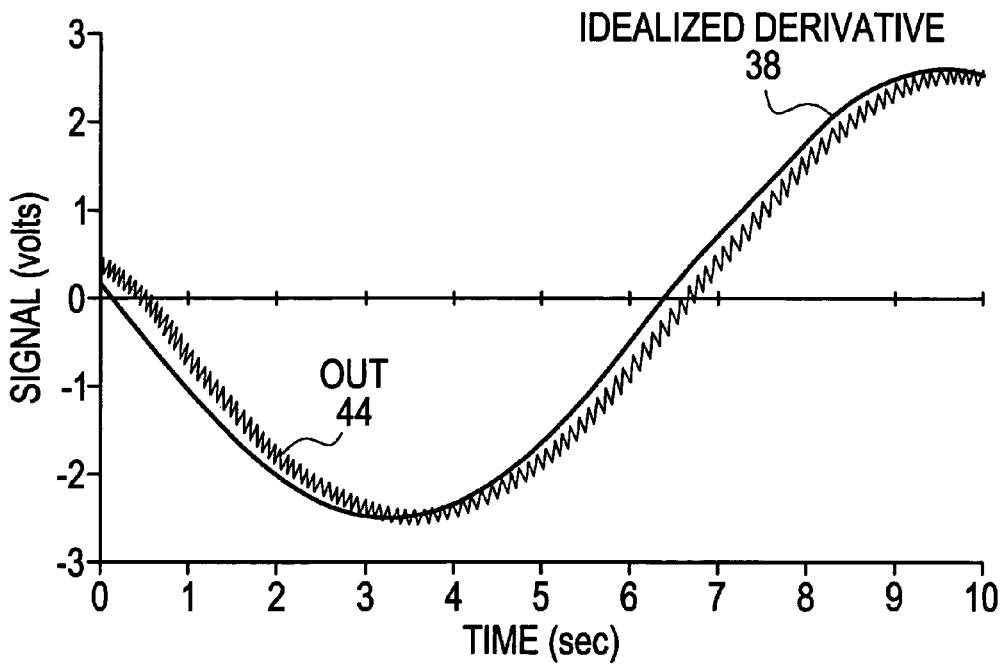
FIG. 3 graphically depicts the idealized derivative of FIG. 2 along with an output waveform generated by the block diagram of FIG. 1 when the input is the noise-containing sinusoidal waveform of FIG. 2.

The advantages of the present invention over a conventional filtering approach are illustrated by the graphs of FIGS. 2-3 for an example in which the input signal IN is a noise-containing sinusoidal waveform, designated by the trace 36 in FIG. 2. The input signal IN is smoothly varying, and the noise is represented by the relatively high frequency, low magnitude, undulation. The trace 38 represents an idealized derivative of trace 36; that is, a derivative based on the value of the smoothly varying component of IN, without regard to the noise. However, calculating the actual derivative of trace 36 produces a very noisy signal such as designated by the reference numeral 40 in FIG. 2. If the noisy actual derivative is low-pass filtered to remove or severely attenuate the content attributable to noise, the result is a signal such as illustrated by the trace 42 in FIG. 2. While the noise content of trace 42 is sufficiently attenuated, it is also significantly phase-delayed with respect to trace 38 (the idealized derivative), as can be easily seen in FIG. 2. A similar result occurs when the input signal IN is low-pass filtered prior to computing the derivative. In contrast, the trace 44 of FIG. 3 represents the output signal (OUT) produced by block 24 of FIG. 1 when the input (IN) is the noise-containing waveform represented by trace 36 of FIG. 2. The trace 44 has a residual undulation similar to the filtered actual derivative trace 42 of FIG. 2, but the periodic resetting of OUT to the RESET_VALUE (which occurs approximately twice per second in the example of FIGS. 2-3) causes the trace 44 to substantially conform in phase with the idealized derivative (i.e., trace 38).

In summary, the present invention provides a way of effectively determining the derivative of a noise-containing input signal without introducing any significant phase delay. Essentially, an aliased derivative is used to periodically reset a filtered version of a normally determined derivative, with the filter output being reset to a weighted sum of the aliased derivative and the filter output at each update of the aliased derivative. The periodically reset filter output closely follows an idealized derivative of the input signal, substantially eliminating the phase delay introduced by conventional filtering.

While the method of the present invention has been described with respect to the illustrated embodiment, it is recognized that numerous modifications and variations in addition to those mentioned herein will occur to those skilled in the art. For example, the gain G may be different than mentioned herein, and so on. Accordingly, it is intended that the invention not be limited to the disclosed embodiment, but that it have the full scope permitted by the language of the following claims.

The invention claimed is:

1. A method of determining a phase-corrected derivative of a noise-containing input signal, comprising the step of:
   periodically sampling the input signal to form a data stream of successive input signal values;
   determining a normal derivative of the input signal based on a rate of change with respect to time between successive input signal values separated by a time interval $\Delta t$, and updating said normal derivative at the time interval of $\Delta t$ to form a first data stream of normal derivative values;
   determining an aliased derivative of the input signal based on a rate of change with respect to time between successive input signal values separated by an increased interval of an integer R times the time interval $\Delta t$, and updating said aliased derivative at the increased interval to form a second data stream of aliased derivative values;
   low-pass filtering said first data stream of normal derivative values to form a derivative output; and
   periodically resetting said derivative output to a reset value based in part on said second data stream of aliased derivative values, wherein the resetting removes a phase delay in the first data stream introduced by the low-pass filtering to create the phase-corrected derivative.

2. The method of claim 1, including the step of:
   resetting said derivative output to said reset value at each update of said aliased derivative.

3. The method of claim 1, including the step of:
   determining a weighted sum of said aliased derivative and said derivative output to form said reset value.

4. The method of claim 1, including the step of:
   at each update of said aliased derivative:
   determining a weighted sum of said aliased derivative and said derivative output; and
   resetting said derivative output to said weighted sum.

\* \* \* \* \*